United States Patent [19]
Kauffman

[11] Patent Number: 5,266,353
[45] Date of Patent: Nov. 30, 1993

[54] METHOD FOR PROTECTING FEED

[75] Inventor: Marvin Kauffman, Montezuma, Ga.

[73] Assignee: Hydro-Tect, Inc., Montezuma, Ga.

[21] Appl. No.: 850,552

[22] Filed: Mar. 13, 1992

Related U.S. Application Data

[62] Division of Ser. No. 574,734, Aug. 30, 1990, Pat. No. 5,120,362.

[51] Int. Cl.$^5$ .............................................. C09K 3/18
[52] U.S. Cl. ..................... 427/180; 427/196; 427/197; 427/256; 427/421; 106/154.1; 106/197.2; 426/310
[58] Field of Search ............... 106/154.1, 197.2; 426/310; 427/180, 196, 197, 256, 421

[56] References Cited

U.S. PATENT DOCUMENTS 4,859,480 8/1989 MacFarlane et al. ............... 426/310

FOREIGN PATENT DOCUMENTS 164 of 1857 United Kingdom ............ 106/154.1

Primary Examiner—David Brunsman
Attorney, Agent, or Firm—David I. Roche

[57] ABSTRACT

A protectant for forage crops. The protectant is made from a mixture of water and plaintain husks, such as psyllium. A thickening and suspending agent ma be used to assist the adherence of the protectant to harvested forage. A preferred agent is carboxymethyl-cellulose (CMC), an accepted additive for use in food products. The mixture when dried forms a moisture resistant hardened coating which prohibits the crops from deterioration and weather. A layer of the protectant is applied to the generally upwardly facing surfaces of a quantity of forage. A common form of accumulated forage is the round bale, and the protectant of the present invention is preferably applied to round bales with a arcuate sprayboom which applies a heavier layer of the protectant to top surfaces of the bale and a lighter layer to side surfaces.

8 Claims, 1 Drawing Sheet

METHOD FOR PROTECTING FEED

This is a division of application Ser. No. 574,734, filed Aug. 30, 1990 now U.S. Pat. No. 5,120,362.

BACKGROUND AND SUMMARY OF THE INVENTION

This invention relates to a weather-shield for protecting feeds for animals. In particular, the invention relates to a spray-on coating for bales of materials such as alfalfa and hay.

As used herein, the term "feed" is defined as commodities, such as hay, straw, stover, cobs, husks, hulls and similar stored fodder, the storage of which generally occurs outdoors. Because such feeds are harvested or produced at different rates than they are consumed, it is frequently necessary to accumulate considerable amounts of such feeds for extended periods of time. The configuration of bulk feeds can be in a variety of forms, such as stacks and bales of various shapes. A particularly common form of bale is the round (cylindrical) bale, which can vary in length, diameter and weight, but which results in a mass of feed weighing several hundred pounds. Other forms of stored feed with which the invention may be used include rectangular and square bales, stacks and bunker and upright silos.

Protecting such material from weather is a significant problem. The construction of shelters or sheds is a somewhat costly technique. Alternatively, wrapping baled material in plastic sheets is a technique which has been used, however, plastic sheets are difficult to apply and keep in place. Furthermore, plastic sheets cannot be ingested by animals and care must be taken to remove the sheets before the feed can be used.

There have been attempts to coat fodder with protective, digestible material. Examples of such attempts are disclosed in U.S. Pat. No. 4,540,486 to Moore, and in U.S. Pat. Nos. 4,846,890 and 4,859,480 to MacFarlane. The Moore coating comprises a monomer catalytically polymerized by acid blended with a sufficient amount of a nutritive cross-linking agent. The monomer recommended by Moore is an aqueous urea-formaldehyde resin, and the cross-linking agent which Moore recommends is a carbohydrate, such as molasses.

In the MacFarlane patent, it is suggested that an emulsion comprising a phosphoprotein casein, or a soybean oil, be used in combination with an emulsifying agent, such as polyethylene glycol, or a polyacrylamide polymer.

However, it is believed that such attempts represent impractical and expensive solutions to the problem of the weathering of baled or stockpiled feed.

It is, therefore, a primary object of the present invention to provide a practical and inexpensive method of protecting feed from deterioration resulting from outdoor storage.

Another object of the present invention is to provide a coating which is simple to prepare and which can be made with minimal mixing equipment.

Yet another object of the present invention is to provide a simple method and apparatus for applying the coating of the present invention.

Still another object of the present invention is to provide a coating for use in protecting baled material which can be easily digested and readily accepted by livestock.

A further object of the invention is to provide a coating for baled material which is made of components which are readily accepted by regulatory agencies as being harmless to livestock.

These, and other objects of the invention, are achieved with an aqueous suspension comprised primarily of water and ground psyllium seed husks. Psyllium seed is well known as a laxative for humans, particularly when combined with a sweetening agent, such as in a product known as Metamucil ®. Psyllium seed is the seed of a fleawort, and has the property of swelling and becoming gelatinous when mixed with water. Fleawort is a member of the plaintain family. It has been found that by mixing ground psyllium seed husks with water and applying the suspension to bales of feed, a protective coating is formed which significantly affects the resistance of the baled material to degradation from weather. In a preferred form of the invention, a small amount of carboxymethylcellulose (CMC) is added as a thickening and suspending agent. In accordance with the present invention, the psyllium husks and CMC are combined in a dry form to form a powder. The powder can be mixed with water at a rate of about 2 parts powder to about 98 parts water. The mixing can take place immediately prior to application of the suspension. Application is preferably achieved by spraying the suspension onto baled material, and by applying a substantially heavier coating of the suspension on generally horizontal surfaces of the baled material, as compared to more vertically oriented surfaces. For bales which are cylindrical in shape, an arcuate or half-moon-shaped dispensing device can be used to quickly and effectively apply the suspension to a series of adjacent bales.

DETAILED DESCRIPTION OF THE INVENTION

A mixture made in accordance with the present invention includes a relatively small amount of ground psyllium mixed with water. In a preferred form of the invention, a thickening and suspending agent is added to the psyllium in the dry state. Carboxymethylcellulose (CMC) has been found to be an effective thickening and suspending agent.

A convenient form for the dry mixture of psyllium husks and CMC is a container, such as the paperboard cartons used to hold half-gallons of milk. The dry psyllium husks and dry CMC are combined and mixed together to form a powder, using about 3 parts psyllium and one part CMC, by weight. Approximately 32 ounces (dry weight) are preferably mixed with approximately 12.5 gallons of water. This produces a mixture which is about 1.9% powder and about 98.2% water by weight. The resulting suspension, or solution as the case may be, produces enough coating material for about 10 large round bales. (For example those which average approximately 1500 lbs.)

On a smaller scale, the mixture of the present invention can be made by mixing about 1.5 to about 3.5 ounces (dry weight) with about 5 quarts of water. Up to about 1.5 ounces of CMC may be added to the mixture, preferably prior to combination with water. In drier weather (i.e., low humidity) conditions, the higher range of water content will be preferable, since the tendency for the water to evaporate will be greater. That is, in drier weather, less psyllium and less CMC can be used with the same amount of water. A workable and effective mixture can be made using 2.5 ounces of psyllium, 0.75 ounces of CMC and 5 quarts of water. Such a mixture will generally make enough of the suspension to coat one large round bale. In this preferred mixture, the ratio of psyllium to CMC is 3.3 to 1 (by weight), and the power is mixed with water in a ratio of about 2 parts powder to 100 parts water.

Figure 2:
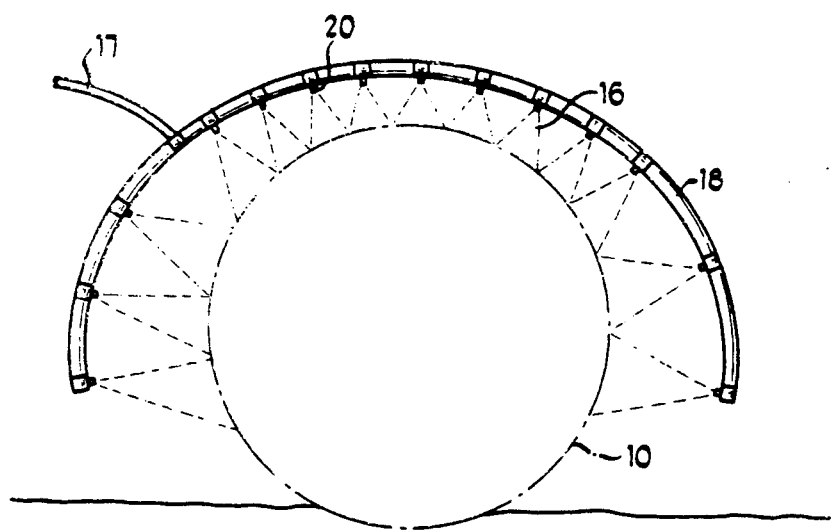
FIG. 2 is an elevational view of the device used to apply the protectant of the present invention.

The primary purpose of the coating is to protect against the infiltration of rain water to interior locations within the bales, where such moisture can accelerate contaminative effects. As can be seen in FIG. 2, it is necessary to coat approximately the upper two-thirds of the curved surface of a bale 10 in order to protect it from rain water infiltration. The vertical, or planar, sides of a bale are generally protected by adjacent bales when the bales are placed in a row. However, it may be necessary to apply the coating of the present invention to the outer planar surfaces of the first and last bales in a row.

Figure 1:
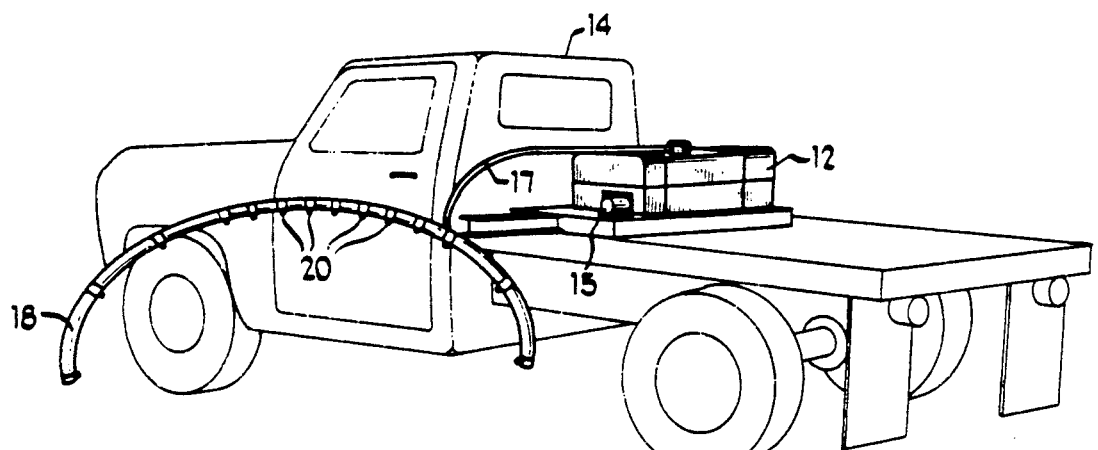
FIG. 1 is a perspective view of a truck adapted to apply the protectant of the present invention.

FIGS. 1 and 2 show a device which is designed to facilitate the application of the coating of the present invention. A tank 12 is carried on a flat bed truck 14. A small, gas powered pump 15 drives the protectant 16 through a connecting hose 17 from the tank 12 to the distributing spray-boom 18. The sprayboom 18 is a generally arcuate member which supports nozzles 20 spaced along the length thereof. The spacing of the nozzles is such that a heavier amount of protectant is deposited on the top of the bale 10 (shown schematically in FIG. 2), and a lighter coating is applied to the sides of the bale. This is done because the corrosive effects of rain and sun are more severe on the top of the bale than on the sides. In the embodiment shown in FIGS. 1 and 2, the heavier top coating is achieved by a more frequent spacing of distribution nozzles 20 at the center of the sprayboom. However, alternatively, nozzles with higher flow rates could be used instead of the larger number of nozzles as shown.

Once the hydrated mixture has been mixed and applied to the outer surfaces of a quantity of agricultural material, it will dry to a relatively hard protective layer. Depending on weather conditions, drying can be expected to take place in a few to several hours. The coating serves as a protective shell which significantly reduces contamination of the baled material for many months.

Another distinct advantage of the present invention, as compared to other methods of protecting feed, is its ability to be stored in dry form. The dry mixture of the present invention can be stored in the dry state for an extended period of time, and can be mixed with water for immediate use.

Another advantage of the present invention is the safety of the materials which comprise the protectant of the present invention. Psyllium husks and CMC are well-known to be ingestible substances. The protection of the present invention, therefore, is achieved without the use of any artificial materials or chemicals.

While a specific embodiment of the invention has been shown and described, it will be apparent to those skilled in the art that numerous alternatives, modifications, and variations of the embodiment shown can be made without departing from the spirit and scope of the appended claims.

I claim:

1. A method of protecting harvested agricultural products comprising the steps of:
   preparing a mixture of ground psyllium husks and water, said mixture comprising from about 0.9 to about 13 percent ground psyllium husks and from about 87 to about 99.1 percent water;
   applying said mixture to harvested agricultural products; and
   allowing said mixture to dry to form a protective shell on outside surfaces of said harvested agricultural products.

2. A method in accordance with claim 1 wherein:
   said step of preparing said mixture includes the step of adding a film forming and suspending agent to said ground psyllium husks prior to mixture of said ground psyllium husks with said water.

3. A method in accordance with claim 1 wherein:
   said step of applying said mixture includes the steps of:
   placing said mixture in a container; and
   dispensing said mixture from said container through a fluid outlet device having at least one spray nozzle.

4. A method in accordance with claim 3 wherein:
   said dispensing step includes the application of dispensing pressure of between about 30 to about 50 psi.

5. A method in accordance with claim 3 wherein:
   said step of dispensing said mixture includes an application of a heavier layer of said mixture on upper portions of said harvested agricultural products than on lower portions thereof.

6. A method of accordance with claim 1 wherein:
   said method includes the steps of:
   preparing a dry powder mixture of ground psyllium husks and a thickening agent prior to mixing said ground psyllium husks with said water.

7. A method in accordance with claim 6 wherein:
   said thickening agent is carboxymethylcellulose.

8. A method in accordance with claim 6 wherein:
   said dry powder mixture is formed by mixing about 3 parts ground psyllium husks to about 1 part of said thickening agent.

* * * * *